C. N. WALTON.
WEED PULLER.
APPLICATION FILED SEPT. 13, 1912.
1,079,619.
Patented Nov. 25, 1913.
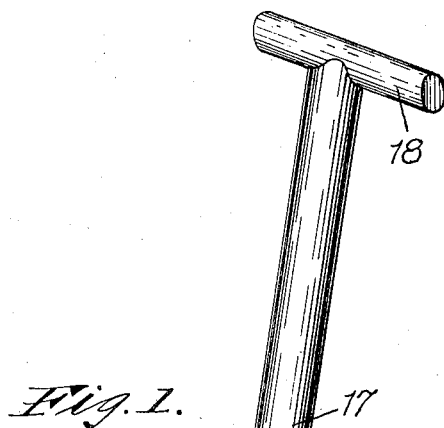
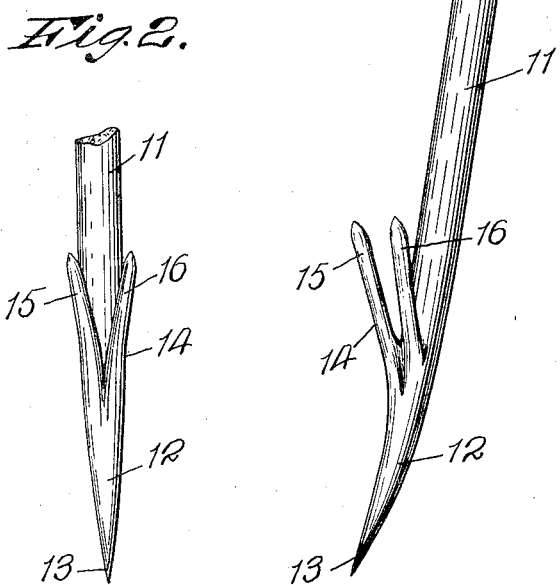

UNITED STATES PATENT OFFICE.

CHARLES N. WALTON, OF MONROE, NEW YORK.

WEED-PULLER.

1,079,619.

Specification of Letters Patent. Patented Nov. 25, 1913.

Application filed September 13, 1912. Serial No. 720,231.

*To all whom it may concern:*

Be it known that I, CHARLES N. WALTON, a citizen of the United States, and a resident of Monroe, county of Orange, and State of New York, have invented a certain new and useful Improvement in Weed-Pullers, of which the following is a full, clear, and exact specification.

This invention relates to a class of implements adapted to be used by gardeners, farmers, or other persons.

My invention has for its object primarily to provide a form of implement, or weed puller designed to be employed for facilitating the work of removing weeds, or the like from gardens, or similar places which are a well known detriment to the growth of flowers, vegetables, and other products grown in the ground. This is accomplished mainly by employing a body portion having a pointed extension, or member adapted to be inserted into the earth adjacent to the roots of the weed, and by the use of a gripping element, or fork projecting from the body portion roots of the weed are engaged in a manner to permit the implement to be readily directed to extract the weed without disturbing the soil of the product which may be growing contiguous to the weed.

A further object of the invention is to provide a weed puller of a simple and efficient form, and which is susceptible of being made in various sizes for use as occasion requires.

A practical embodiment of the invention is represented in the accompanying drawing forming a part of this specification in which similar characters of reference indicate corresponding parts in all the views, the said invention being more fully described hereinafter, and then pointed out in the appended claims.

In the drawing, Figure 1 is a detail elevation of one form of implement embodying my invention, and Fig. 2 is a fragmentary view showing the sharpened extension and gripping element of the implement.

The implement, or weed puller 10 has a body portion 11 which is preferably in the form of a rod made of metal, and integrally formed upon one end of said rod is an extension, or member 12. The extension 12 is slightly curved, and is gradually tapered so as to provide a pointed free end 13 whereby said extension may be readily inserted into the earth the required distance.

At the juncture of the body portion 11 and the extension 12 is a gripping element, or fork 14 which serves to engage the roots of the weed when inserted into the earth to permit the weed to be readily extracted by the use of the implement. The gripping element, or fork 14 has two prongs 15 and 16 which are arranged substantially in the shape of a V, and both of said prongs are disposed so that the free ends thereof extend in an opposite direction to the extension 12 and are spaced some distance from the body portion 11 of the implement.

Upon the end of the body portion 11 which is opposite to the sharp extension 12 is a handle 17 which may be of any suitable length, and mounted on said handle is a cross-bar 18, in order to permit the implement to be conveniently manipulated. In using the implement the pointed extension 12 and the V-shaped fork 14 are forced into the earth in a manner so that the fork will be guided under and engage the roots of the weed between the prongs 14 and 15. By then pulling upon the handle of the implement the weed will be readily extracted from the earth without disturbing to an appreciable extent the soil of the product which may be growing contiguous to the weed, thus by the use of my implement the work of efficiently weeding a garden, or similar place may be properly done and greatly facilitated.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

1. A weed puller comprising a bar, a handle provided upon the upper end of the bar, a curved pointed lower end, and two pointed divergent prongs springing from the concave side of the curved end, and extending upwardly, substantially as and for the purposes set forth.

2. In a weed puller, a rod adapted to serve as a handle, a cross bar disposed upon its upper end, a curved cylindrical pointed lower end adapted for penetrating the earth, and two cylindrical pointed divergent upwardly disposed prongs projecting from the concave side of the curved end of the rod, substantially as and for the purposes set forth.

This specification signed and witnessed this twelfth day of September A. D. 1912.

CHARLES N. WALTON.

Witnesses:
ROBT. B. ABBOTT,
M. DERMODY.